US005483634A

United States Patent [19]

Hasegawa

[11] Patent Number: 5,483,634

[45] Date of Patent: Jan. 9, 1996

[54] DISPLAY CONTROL APPARATUS AND METHOD UTILIZING FIRST AND SECOND IMAGE PLANES

[75] Inventor: Taketo Hasegawa, Yokohama, Japan

[73] Assignee: Canon Kabushiki Kaisha, Tokyo, Japan

[21] Appl. No.: 62,214

[22] Filed: May 18, 1993

[30] Foreign Application Priority Data

May 19, 1992 [JP] Japan .................................... 4-126146

[51] Int. Cl.[6] ...................................................... G06F 15/00

[52] U.S. Cl. .......................... 395/162; 358/456; 345/147

[58] Field of Search .................................... 395/132, 131, 395/162, 164–166; 345/89, 97, 147; 358/261.1, 429, 443, 445, 447, 448, 455–458

[56] References Cited

U.S. PATENT DOCUMENTS

| | | | |
|---|---|---|---|
| 4,958,238 | 9/1990 | Katayama et al. | 358/455 |
| 4,964,699 | 10/1990 | Inoue | 350/332 |
| 5,130,819 | 7/1992 | Ohta | 358/445 |
| 5,253,340 | 10/1993 | Inoue | 395/163 |
| 5,253,936 | 10/1993 | Ishida | 358/456 |
| 5,309,254 | 5/1994 | Kuwabara et al. | 358/456 |

FOREIGN PATENT DOCUMENTS 0378780 7/1990 European Pat. Off. .

OTHER PUBLICATIONS

"Halftoning Method for Mosaic Color Displays Using Error Diffusion", IBM Technical Disclosure Bulletin, vol. 32, No. 5A, pp. 194–197 (Oct. 1989).

*Primary Examiner*—Mark R. Powell
*Assistant Examiner*—Kee M. Tung
*Attorney, Agent, or Firm*—Fitzpatrick, Cella, Harper & Scinto

[57] ABSTRACT

A display control apparatus includes an input device to input image data, a memory to store the inputted image data by an amount corresponding to first and second image planes, a comparator to compare the stored image data of the first and second image planes, and a processor to halftone process the image data of the pixel in which the value of the image data of the first image plane is different from the value of the image data of the second image plane. A transmitting circuit transmits the data which has been halftone processed by the processor to a display apparatus such as a ferroelectric liquid crystal display. The image data is sent from a computer, a hard disc drive, a floppy disk drive, or the like.

16 Claims, 10 Drawing Sheets

DISPLAY CONTROL APPARATUS AND METHOD UTILIZING FIRST AND SECOND IMAGE PLANES

BACKGROUND OF THE INVENTION

1. Field of the Invention

The present invention relates to a display control apparatus and method and, more particularly, to display control apparatus and method for a display apparatus having, for example, a ferroelectric liquid crystal as an operating medium for updating a display content, in which such a ferroelectric liquid crystal can hold a display state updated by applying an electric field or the like.

2. Related Background Art

Generally, in an information processing system or the like, a display apparatus is used as information display means for performing a visual expressing function of information. A CRT display apparatus is widely known as such a display apparatus.

In a display control in the CRT display apparatus, the writing operation of a CPU on the system side for a video memory as a display data buffer which the CRT side has and the operations to read out the display data from a video memory and to display the display data which are executed by, for example, a CRT controller which the CRT side has are respectively independently executed.

In case of the display control of the CRT as mentioned above, the writing operation of the display data to the video memory for the purpose of a change in display information or the like and the operations to read out the display data from the video memory and to display it are independently executed. Therefore, there is an advantage such that in a program on the information processing system side, there is no need to consider the display timing or the like and desired display data can be written at an arbitrary timing.

On the other hand, since the CRT needs a certain length in the direction of thickness of the display screen in particular, volume of the entire CRT increases and it is difficult to miniaturize the whole display apparatus. Consequently, when the information processing system using such a CRT as a display is used, degrees of freedom, namely, degrees of the installing location, portability, and the like are lost.

A liquid crystal display (hereinafter, referred to as an LCD) can be used as a display which can solve such a drawback. Namely, according to the LCD, the whole display apparatus can be miniaturized (especially, a thickness can be thinned). Among such LCDs, there is a display (hereinafter, referred to as an FLCD: FLC display) using a liquid crystal cell of a ferroelectric liquid crystal (hereinafter, referred to as an FLC: Ferroelectric Liquid Crystal) mentioned above. One of the features of the FLCD is that the liquid crystal cell has a preserving performance of a display state when an electric field is applied. Namely, in the FLCD, the liquid crystal cell is thin enough and an elongated FLC molecule in the liquid crystal cell is oriented in the first or second stable state in accordance with the applying direction of the electric field. Even when the electric field is extinguished, each orienting state is maintained. The FLCD has a memory performance due to such a bistability of the FLC molecule. Such FLC and FLCD have been described in detail in, for example, in U.S. Pat. No. 4,964,699.

Therefore, in case of driving the FLCD, different from the CRT or other liquid crystal displays, there is a surplus time in the continuous refresh driving period of time of the display screen. On the other hand, irrespective of the continuous refresh driving, it is possible to perform a partially rewriting driving to update the display state of only the portion corresponding to the change portion on the display screen.

Therefore, in the FLCD, if the partially rewriting driving can be properly executed at a good timing, the advantage of the FLCD can be further enhanced.

If such an FLCD can be used as a display apparatus of the information processing system so as to have a compatibility with the CRT, a flexibility of the system increases and its value can be raised.

From the above viewpoint, it is possible to consider a display control method whereby the partial rewriting operation of a predetermined portion is preferentially executed than the partial rewriting operation of other display information. As a display example based on such a display control method, there is a display of continuous image data like an animation and such a display needs to visually change the display state in a real-time manner.

In the case where the display data has a density value every pixel of R (Red), G (Green), and B (Blue), it is necessary to convert the display data into the data which can be displayed (expressed) by the FLCD.

In case of using a method (for example, an error diffusion method) whereby errors which occur upon conversion are reflected to the other pixels instead of a method whereby the conversion is independently executed on a pixel unit basis, there is a problem such that it is necessary to take the converting method into consideration in the partially rewriting driving method.

On the other hand, in case of using the FLCD in place of the CRT as a display apparatus of the information processing system having the CRT display, an essential problem occurs from a viewpoint of the construction. That is, the CPU on the system side merely transfers the display data of one image plane regarding the display updating and its addresses to the display apparatus side. There is, accordingly, a problem with respect to how to discriminate the preceding image plane and the changed portion and to execute the partial rewriting operation as mentioned above.

SUMMARY OF THE INVENTION

The present invention intends to eliminate the drawbacks of the conventional technique as mentioned above and to provide a display control apparatus and method which can display a moving image of a high picture quality to a display apparatus at a high speed.

Another object of the invention is to provide a display control apparatus and method in which an image which has been halftone processed by a quantizing method of a density preserving type can be efficiently displayed on an FLC display.

Still another object of the invention is to provide a display control apparatus and method in which when an image which has been halftone processed by a quantizing method of the density preserving type is displayed, by executing the halftone process to the preceding image plane and the changed portion, the display can be efficiently displayed at a high speed.

A further object of the invention is to provide an image processing apparatus and method in which error data which is necessary for the halftone processes of the preceding image plane and the changed portion is previously stored into a memory, so that a display image of a high picture quality can be obtained by using the error data stored in the memory.

Another object of the invention is to provide an image processing apparatus and method in which when the scene of display data is switched, the error data of the preceding image plane stored in a memory is reset and the halftone process is executed to the data of one image plane inputted, so that a binarizing process which conforms with the input data at a high fidelity can be executed.

The above and other objects and features of the present invention will become apparent from the following detailed description and the appended claims with reference to the accompanying drawings.

DETAILED DESCRIPTION OF THE PREFERRED EMBODIMENT

An embodiment of the present invention will be described in detail hereinbelow with reference to the drawings.

Figure 1:
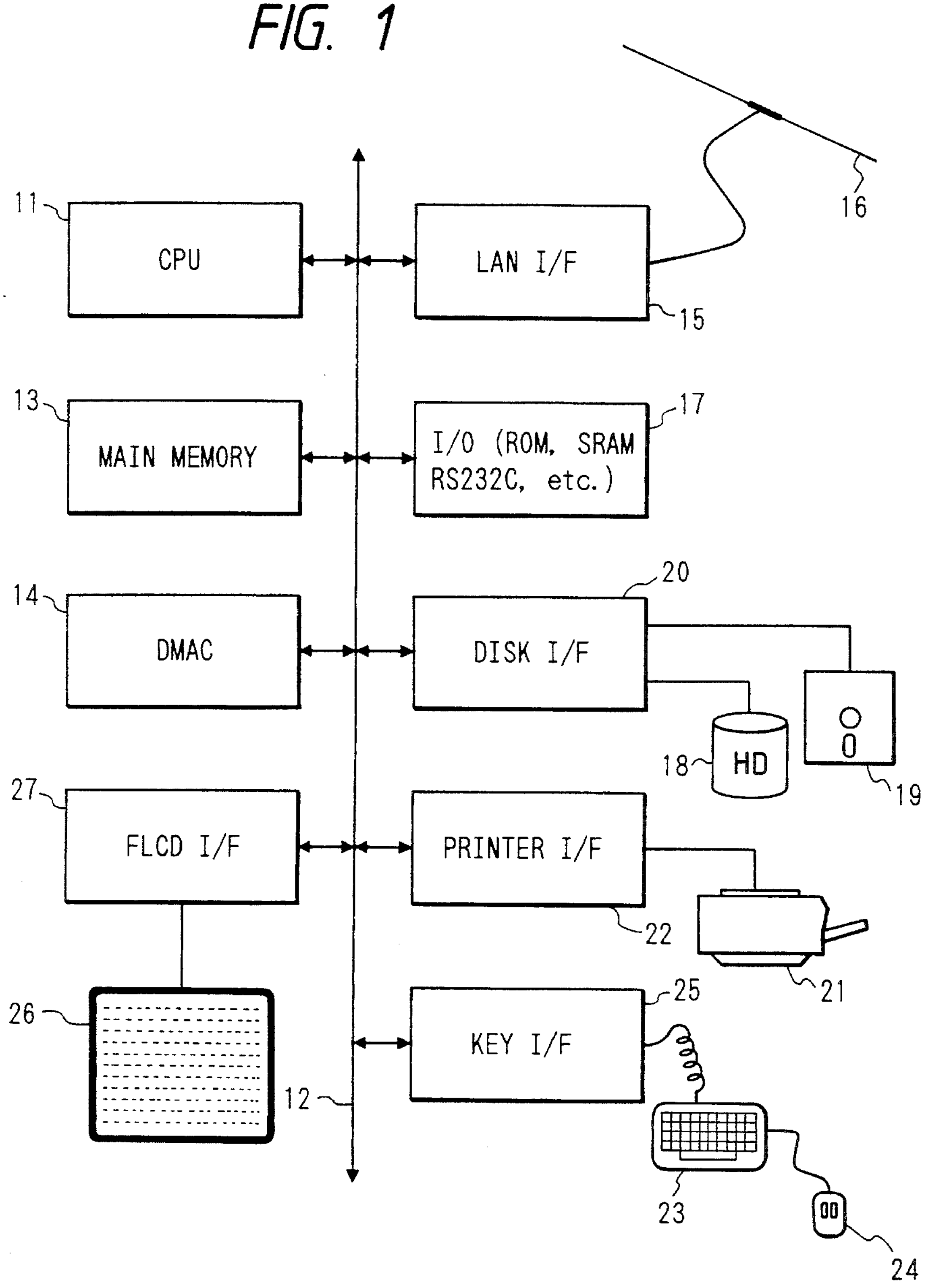
FIG. 1 is a block diagram showing a system construction according to an embodiment of the present invention.

FIG. 1 is a block diagram of an information processing system using an FLC display apparatus having a display control apparatus according to an embodiment of the present invention as a display apparatus of various kinds of characters, image information, and the like. In the diagram, reference numeral 11 denotes a CPU to control the entire information processing system; 13 a main memory which is used to store programs which are executed by the CPU 11 or is used as a work area when the programs are executed; and 14 a DMA controller (Direct Memory Access Controller; hereinafter, referred to as a DMAC) to transfer data among the main memory 13 and various kinds of apparatuses constructing the information processing system without passing through the CPU 11. Reference numeral 15 denotes an LAN interface to interface between an LAN (Local Area Network) 16 such as an Ethernet or the like and the system and 17 indicates an input/output apparatus (hereinafter, referred to as I/O) having an ROM, an SRAM, an interface of the RS232C type, and the like. Various kinds of external apparatuses can be connected to the I/O 17. Reference numerals 18 and 19 denote a hard disc drive and a floppy disc drive as external memory devices; 20 a disk interface to connect signals between the hard disc drive 18 and floppy disk drive 19 and the system; 21 a printer which can record at a relatively high resolution and can be constructed by an ink jet printer, a laser beam printer, or the like; 22 a printer interface to connect signals between the printer and the system 23 a keyboard to input character information such as various kinds of characters or the like, control information, or the like; 24 a mouse as a pointing device; 25 a key interface to connect signals among the keyboard 23, the mouse 24, and the system; and 26 an FLC display apparatus (hereinafter, also referred to as an FLCD) whose display is controlled by an FLCD interface 27 as a display control apparatus according to an embodiment of the present invention. The FLCD has a display screen using the foregoing ferroelectric liquid crystal as a display operating medium. Reference numeral 12 denotes a system bus comprising a data bus, a control bus, and an address bus to connect signals among the above various apparatuses.

In the information-processing system to which the above various kinds of apparatuses or the like are connected, generally, the user of the system operates in correspondence to various information which is displayed on the display screen of the FLCD 26. That is, character information, image information, or the like which is supplied from an external apparatus (for example, a scanner) that is connected to the LAN 16 or I/O 17, or from the hard disc 18, floppy disk 19, keyboard 23, or mouse 24, or operation information which has been stored in the main memory 13 and relates to a system operation of the user, or the like is displayed on the display screen of the FLCD 26. While observing the contents displayed on the screen, the user edits the information or executes an instructing operation to the system. The above various kinds of apparatuses or the like construct display information supplying means to the FLCD 26, respectively.

Figure 2:
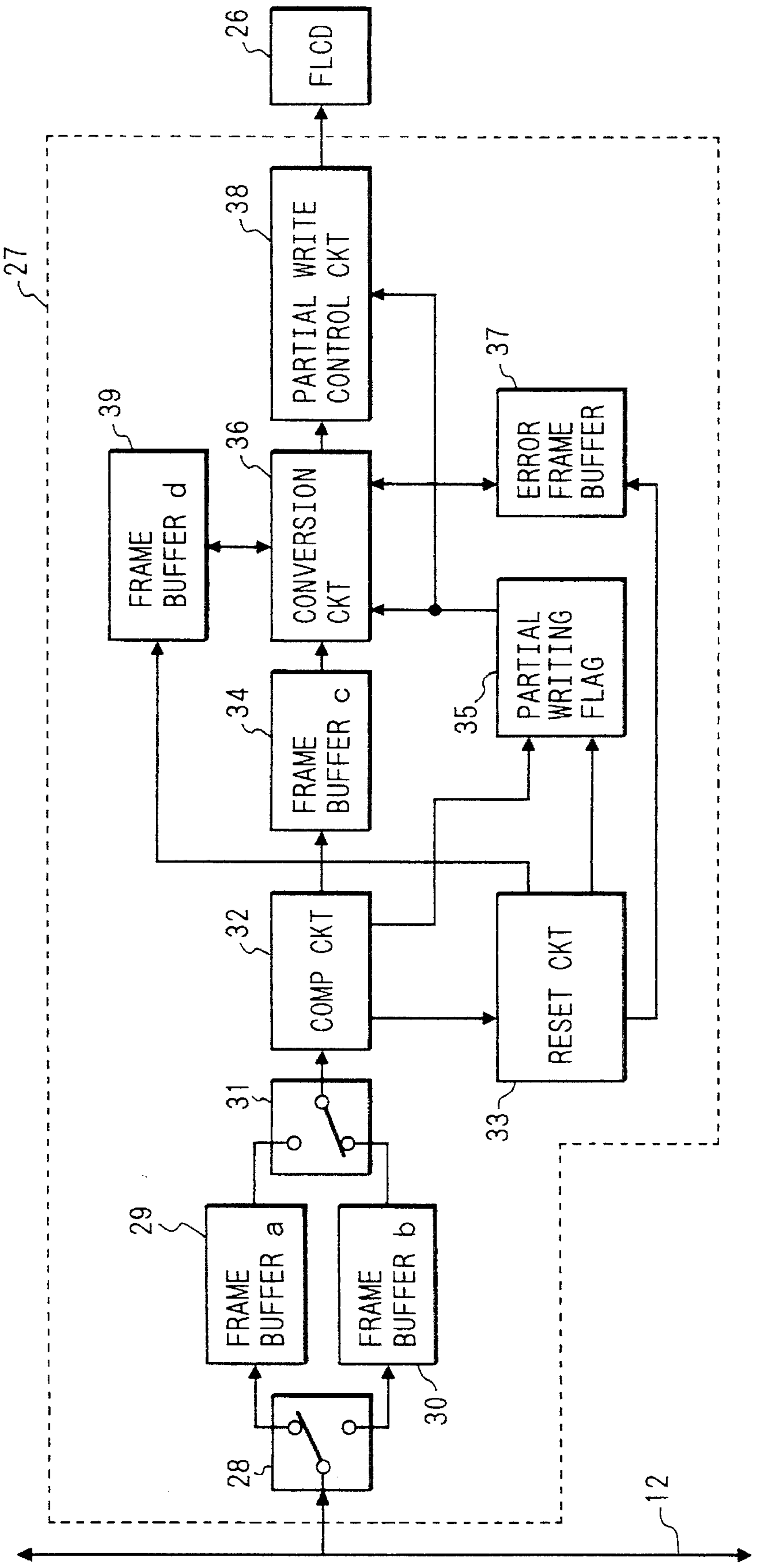
FIG. 2 is a block diagram showing a detailed construction of an FLCD interface in FIG. 1.
Figure 3A:
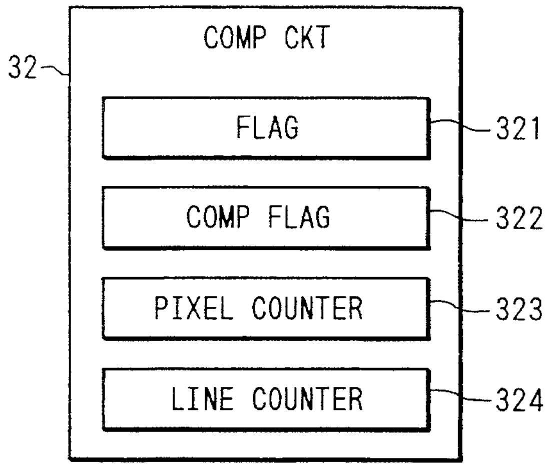
FIG. 3A is a diagram showing a comparison circuit in FIG. 2.
Figure 3B:
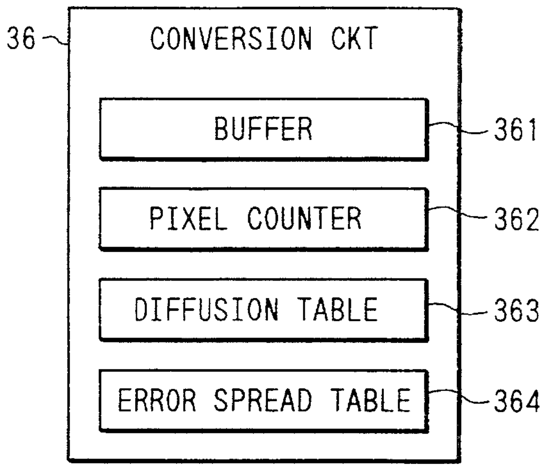
FIG. 3B is a diagram showing a conversion circuit in FIG. 2.

FIG. 2 is a block diagram showing the details of the FLCD interface 27. In the diagram, a switcher 28 is connected to the system bus 12. Each of a frame buffer (a) 29 and a frame buffer (b) 30 can store the display data of one image plane (one pixel consists of eight bits). The frame buffers 29 and 30 are connected to the switchers 28 and 31, respectively. Reference numeral 32 denotes a comparison circuit. As shown in detail in FIG. 3A, the comparison circuit 32 has: a flag 321 for judgment when the image plane is switched; a comparison flag 322 indicative of the result of the judgment of the pixel of one line; a pixel counter 323 to count the number of pixels of one line; and a line counter 324 to count the number of lines of one image plane. Reference numeral 34 denotes a frame buffer (c) (one pixel consists of eight bits) to store the display data of one image plane and transfer the data to a conversion circuit 36. The conversion circuit 36 executes a pseudo halftone process. As shown in detail in FIG. 3B, the conversion circuit 36 has: a buffer 361 for one line; a pixel counter 362 to count the number of pixels of one line; a table 363 to calculate an error value which is spread; and a table error diffusion table 364 to calculate an error value which is spread to each pixel when the error data generated when the input data has been binarized is diffused. Reference numeral 39 denotes a frame buffer (d) (one pixel consists of eight bits) to store the data displayed at that time point by an amount corresponding to one image plane. Reference numeral 35 denotes a partial writing flag. By setting the flag into a line to be partially rewritten, the line is stored. Reference numeral 37 denotes the error frame buffer to store errors occurring when the 8-bit data is converted into the 1-bit data by the conversion circuit 36. The error frame buffer 37 has a capacity corresponding to one image plane (one pixel consists of eight bits).

The error data stored in the error frame buffer 37 will now be briefly explained.

It is now considered the case of binarizing the image data of one pixel $\alpha$ in one image plane by the conversion circuit 36. In the conversion circuit 36, the error data stored at the same address as $\alpha$ is read out from the error frame buffer 37 and the error data is added to the image data of the pixel $\alpha$. The result of the addition is binarized on the basis of a predetermined threshold value. Now, the error data occurring when the previous image plane had been binarized has been stored in the error frame buffer 37. In the embodiment, only the portion in which the value of the inputted data was changed from the preceding image plane is binarized. Therefore, in the data of a certain image plane, when a pixel β in which the value of data differs from that of the preceding image plane occurs, all of the pixels before the pixel β have the same data as that of the preceding image plane. Therefore, as error data which is added to the pixel β, it is sufficient to use the error data stored in the error frame buffer 37 in which the error data of the preceding image plane has been stored. The error data in the error frame buffer 37 is updated on the basis of the binary error data which is generated when the data of the pixel β is binarized. The updated error data is used when the pixels after the pixel β or the pixels of the next and subsequent image planes are binarized.

Reference numeral 33 denotes a reset circuit to initialize the error frame buffer 37, partial writing flag 35, and frame buffer (d) 39.

On the basis of the signal from the comparison circuit 32, when it is determined that the preceding image plane differs from the present inputted image plane (such a case occurs when a scene is switched or the like), the binarizing process by the error diffusion method must be executed for the whole area of one image plane with respect to the newly inputted image plane. Therefore, the data stored in the error frame buffer 37, partial writing flag 35, and frame buffer 39 are unnecessary. Accordingly, the reset circuit 33 resets those data.

Reference numeral 38 denotes a partial write control circuit for executing a partial writing operation to the FLCD 26 with respect to the partial writing line detected by the partial writing flag 35. In the embodiment, for simplicity of explanation, it is now assumed that the display data which is sent from the system bus is black and white data of eight bits.

Figure 4:
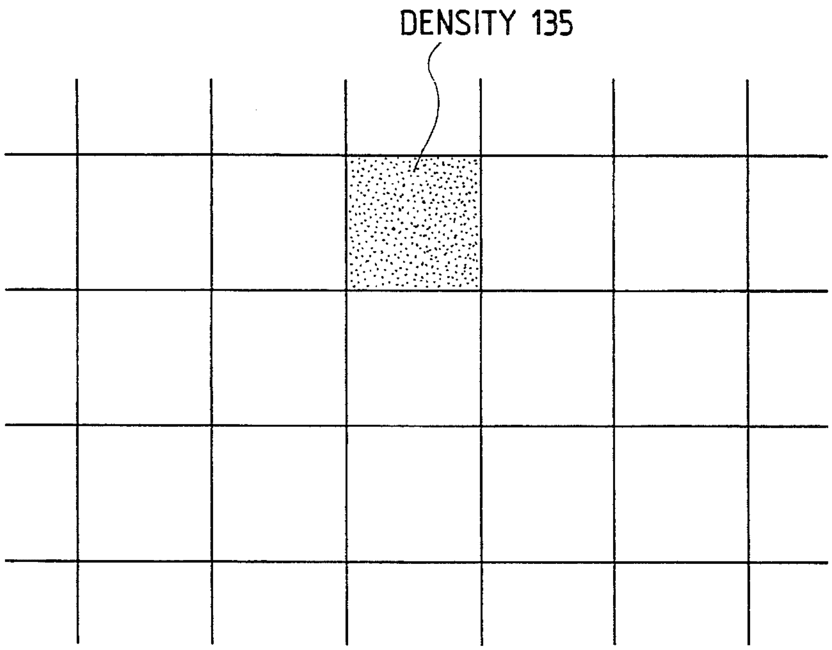
FIGS. 4 to 8 are diagrams for explaining an error diffusion method.
Figure 5:
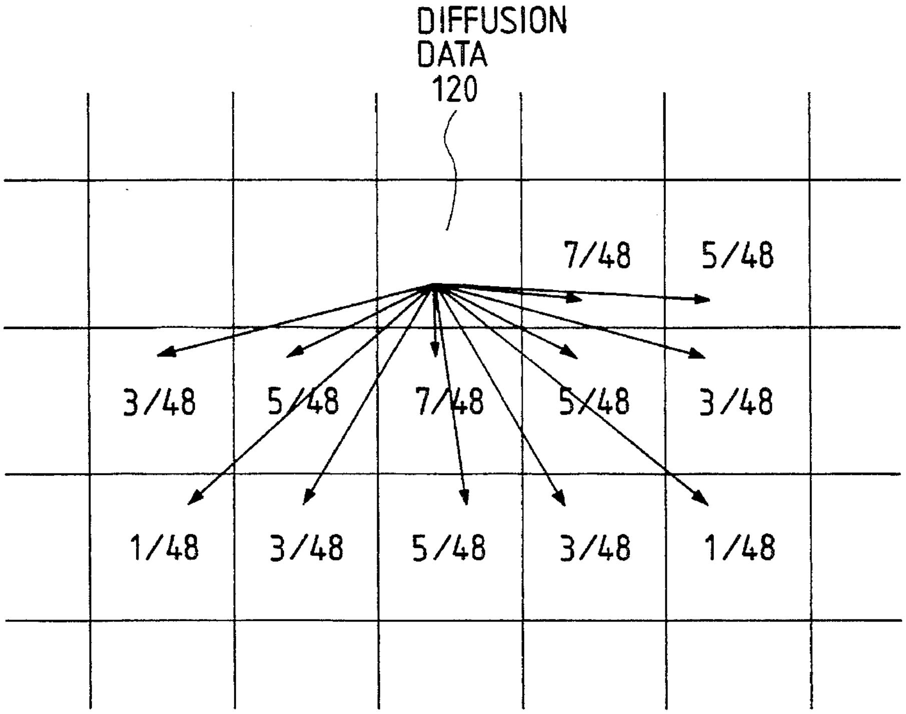

In the embodiment, it is now assumed that the conversion circuit 36 converts the 8-bit data into the 1-bit data by using the error diffusion method as a pseudo halftone process. The principle of the error diffusion method is shown in FIGS. 4 and 5. Since the input data is the 8-bit data, densities of 256 gradations are expressed and a threshold value for binarization assumes 127.

1 A density of a pixel which is at present processed assumes 135. The density value 135 is cumulative data in which the errors occurring by the preceding binarizing processes were added. Namely, the cumulative data denotes data in which the diffused error data was added to the input data and is data that is actually binarized (pseudo halftone processed) by the threshold value.

2 Either one of 0 and 255 is decided. In the above case where the cumulative data is equal to 135, since it is larger than the binarization threshold value 127, it is set to 255.

3 The error data is diffused to the peripheral pixels. Since the value which is inherently equal to 135 has been set to 255, the error data is equal to −120 corresponding to a difference between 255 and 135. In this-instance, the error data is diffused at a ratio (stored in the diffusion table 363 in the conversion circuit 36) which has been determined for peripheral 12 pixels as shown in FIG. 4.

4 The processes are executed to the next pixel. According to the error diffusion method as mentioned above, even when the density level of one certain pixel changes, the error data is spread and diffused with respect to all of the pixels subsequent to such one pixel.

According to the invention, in order to make the most of the feature of the partial writing process as a feature of the FLCD the pseudo halftone process is executed to only the changed portion, thereby raising processing efficiency.

The display data is loaded into the main memory via the HD 18, FD 19, LAN 16, or the like. The display data is processed by the CPU 11 and is transferred to the FLCD interface 27 by the DMAC 14. The above processes are continuously repeatedly executed in order to display continuous image data like an animation.

Figure 6:
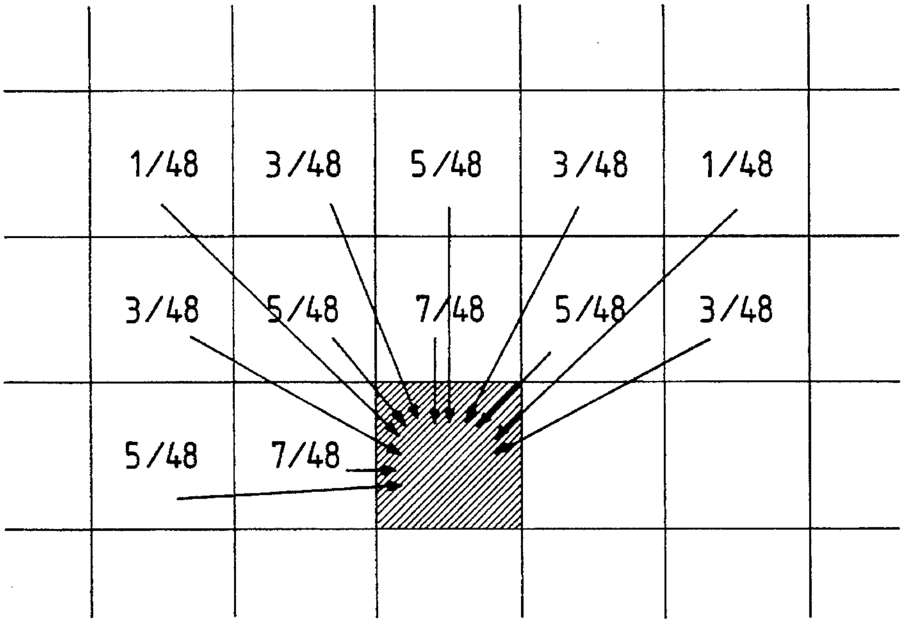

In the FLCD interface 27, the transferred display data is sent to the switcher 28, by which the number of lines of the display data is first counted. When it is detected that the display data of one image plane has been sent, the switch is switched. Due to this, the display data is alternately stored into the frame buffers (a) 29 and (b) 30 on an image plane unit basis. In the initial state, the contents in the frame buffers 29 and 30 have been cleared to 0. The data of one image plane in the first display data is stored into the frame buffer (a) 29. For convenience of explanation, it is now assumed that the display data sent at present is stored into the frame buffer (a) 29 and the display data of one image plane before which had precedingly sent has been stored in the frame buffer (b) 30. That is, the display data in the frame buffer (b) 30 is displayed on the FLCD 26 at a time point when the data is being written into the frame buffer (a) 29. By switching the switcher 31, the display data is supplied to the comparison circuit 32 on a line unit basis in correspondence to the frame buffers (a) 29 and (b) 30. The comparison circuit 32 has line buffers corresponding to two lines. The display data in the frame buffers (a) 29 and (b) 30 is stored into the line buffers. The comparison circuit 32 compares the data stored in each buffer in the comparison circuit 32 by an amount of one line on a pixel unit basis. The line number is notified to the partial writing flag 35 in the case where even one pixel in the line differs. The compared display data is transferred to the frame buffer (c) 34. The above processes are sequentially repeated by an amount corresponding to one image plane. The conversion circuit 36 executes the pseudo halftone process with respect to the line in which the partial writing flag has been set. When the above error diffusion method is used in the pseudo halftone process, as shown in FIG. 6, as for a certain pixel, the error differences of the preceding pixels before such a pixel is processed have been accumulated. FIG. 5 is a diagram showing to which pixels subsequent to a certain pixel the errors are diffused in the case where such a pixel was processed.

Figure 7:
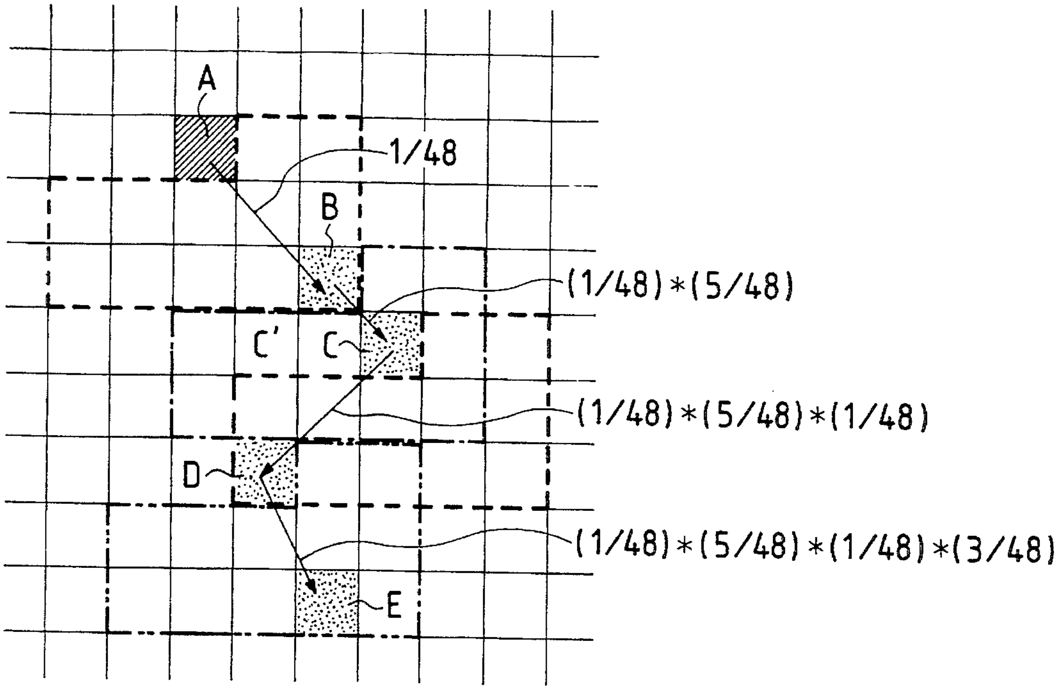

In FIG. 7, when a pixel A is processed, the errors are spread to twelve pixels in the portion surrounded by a broken line. When attention is paid to a pixel B in the broken line portion, the errors are spread to twelve pixels in the portion surrounded by an alternate long and short dash line. By repeating processes similar to those mentioned above, as for a pixel E, a density at the following ratio is added to the errors of the pixel A.

$$E=(1/48)\times(5/48)\times(1/48)\times(3/48) \tag{1}$$

The above equation, however, relates to the case where the pixels were processed in accordance with the order of A→B→C→D. In the case where a pixel C' was processed, the errors of A→B→C'→ D must be added.

Figure 8:
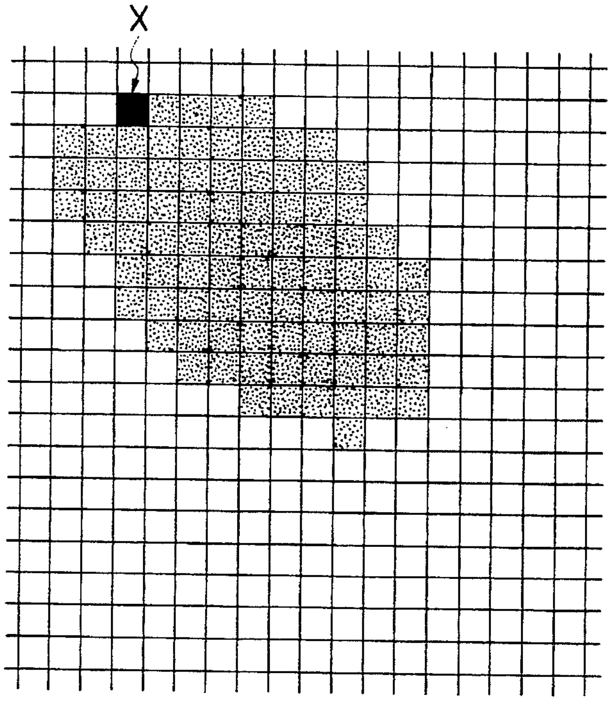

FIG. 8 is diagram showing on which range the errors of a certain pixel exert an influence. However, FIG. 8 shows a range of the pixels such that the absolute value of the error is equal to or larger than 1 when the errors generated in a pixel X in FIG. 8 lie within a range of ±127. Since the cumulative error of the errors of those pixels can be provided as a constant for the pixel to be processed, there is no need to execute complicated calculations (it is sufficient to perform only one addition and one multiplication). The constants of those cumulative errors are previously held in the conversion circuit 36 as a table (hereinafter, referred to as an error spread table). The conversion circuit 36 recognizes the line to be binarized with reference to the partial writing flag 35 and executes a binarizing process to the display data in which the flag has been set in the data which is sent from the frame buffer (c) 34. The data corresponding to the pixel is extracted from the error frame buffer 37 and the value of the error data is added to the pixel and the resultant value is compared with a threshold value, thereby binarizing. Since the data which is sent from the frame buffer (c) 34 is used in the process of the next image plane, it is stored into the frame buffer (d) 39. At the time point when the binarizing process is executed, the data displayed (data of the preceding image plane) has already been stored in the frame buffer (d) 39. Therefore, the data corresponding to the pixel to be binarized is extracted from the frame buffer (d) 39. The value of the extracted pixel (value before the error data is added) is compared with the value of the pixel to be binarized. When they differ, the errors at a time point when the data of the pixel to be binarized was binarized must be reflected to the other pixels. Therefore, the errors of all of the pixels which are influenced are calculated in accordance with the above error spread table and are accumulated into the error frame buffer 37. When the value of the pixels data stored in the frame buffer (d) 39 is equal to the value of the data of the corresponding pixel stored in the frame buffer (c) 34, there is no need to change the value of the errors stored in the frame buffer 37. Therefore, the value in the error frame buffer 37 is not updated. The converted display data is transferred to the partial write control circuit. In the transfer circuit, the corresponding line of the FLCD 26 is rewritten with reference to the partial writing flag. In the case where the number of lines whose values differ exceeds a predetermined value (hereinafter, such a value assumes a constant N) in the comparison circuit 32, this means that the scene of the display data has been switched, so that the reset circuit 33 is activated.

The reset circuit 33 initializes the partial writing flag 35, frame buffer 39, and error frame buffer 37.

The binary data which was pseudo halftone processed is outputted from the conversion circuit 36 and transferred to the partial write control circuit 38. The partial write control circuit 38 executes a partial writing operation to the FLCD 26 with respect to the partial writing lines detected by the partial writing flag 35.

By repeating the above processes, only the changed portion of the continuous data such as an animation can be pseudo halftone processed and displayed.

Figure 9:
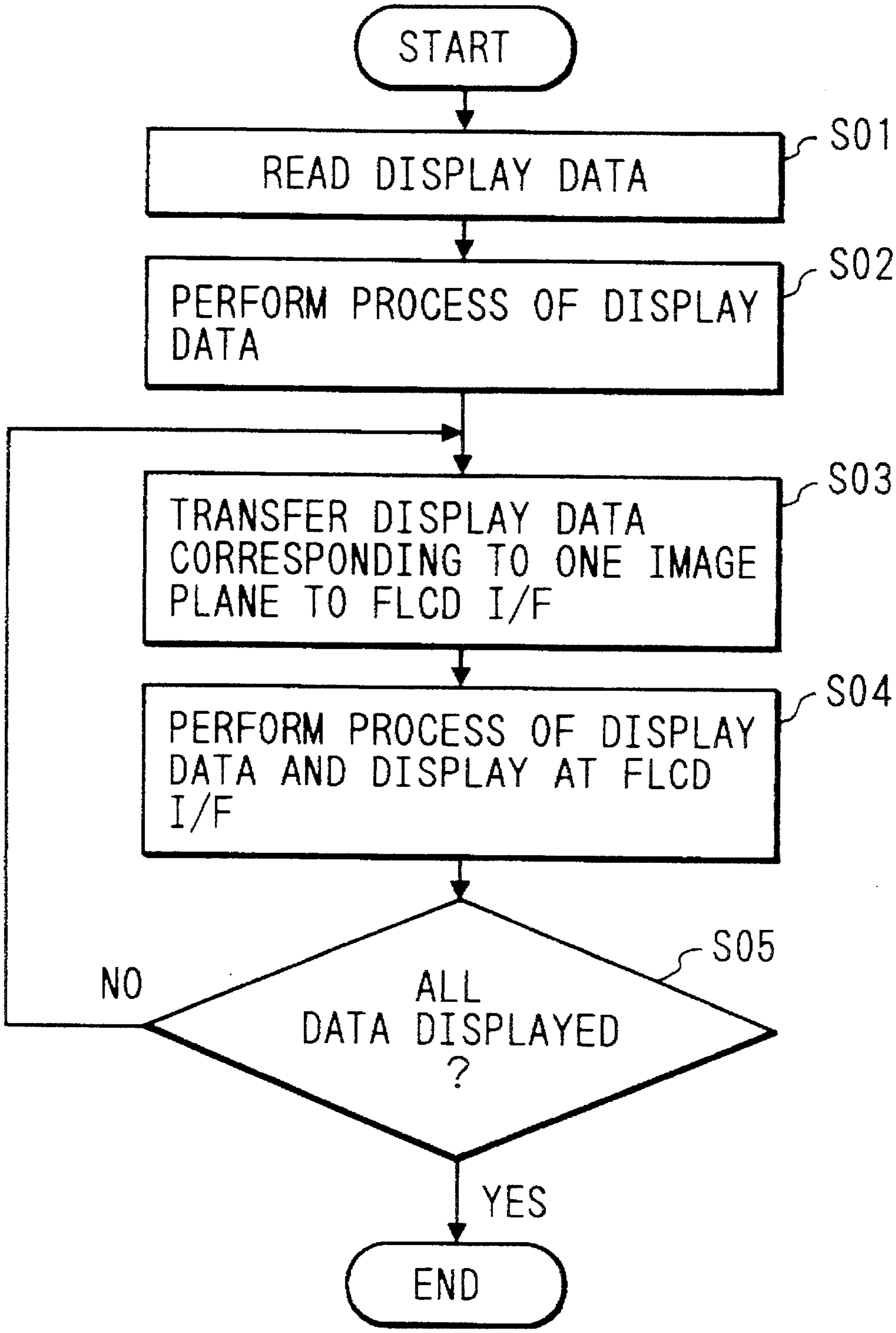
FIGS. 9 to 14 are flowcharts for explaining a display control according to an embodiment.

FIG. 9 is a flowchart when the operation of the embodiment is executed. In the diagram, the display data is read out from the LAN 16, HD 18, or FD 19 and stored into the main memory 13 in step S01. In step S02, the display data read out in step S01 is converted into the display data (multivalue data of every pixel) which can be processed by the FLCD interface 27. In step S03, the display data corresponding to one image plane is transferred to the FLCD interface 27 by using the DMAC 14. In step S04, the display data is processed by the FLCD interface 27 and displayed on the FLCD 26 (as will be explained hereinlater). In step S05, a check is made to see if the entire display data has completely been transferred to the FLCD interface or not. If NO, the processing routine is returned to step S03. By repeating the processes from step S03 to S05, the continuous data such as an animation can be displayed.

FLCD Interface

Figure 10:
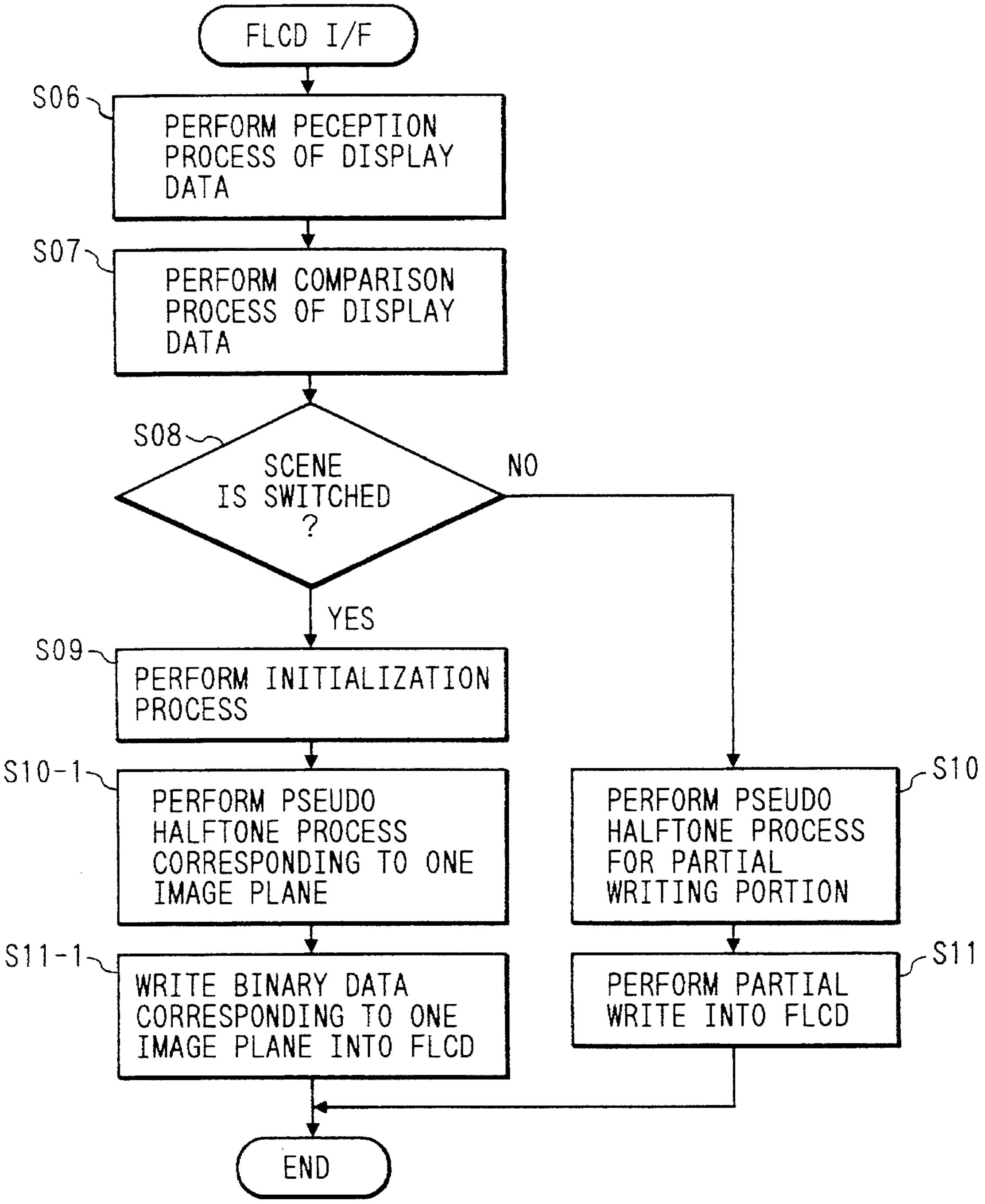

FIG. 10 is a flowchart showing a procedure of the processes which are executed in the FLCD interface 27. In FIG. 10, a reception process of the display data is executed in step S06. In step S07, the display data of the preceding image plane is compared with the display data extracted at present. In step S08, a check is made to see if the scene has been switched or not. When the scene is not switched, step S10 follows and the pseudo halftone process is executed to the portion in which those display data differ. In step S11, the partial writing operation is executed to,the FLCD. When the scene is switched, the initializing process is executed in step S09. The processing routine advances to step S10-1 and the pseudo halftone process is executed to all of the data of the image planes extracted at present. In step S11-1, the binary data corresponding to one image plane is written into the FLCD.

Display Data Reception Process

Figure 11:
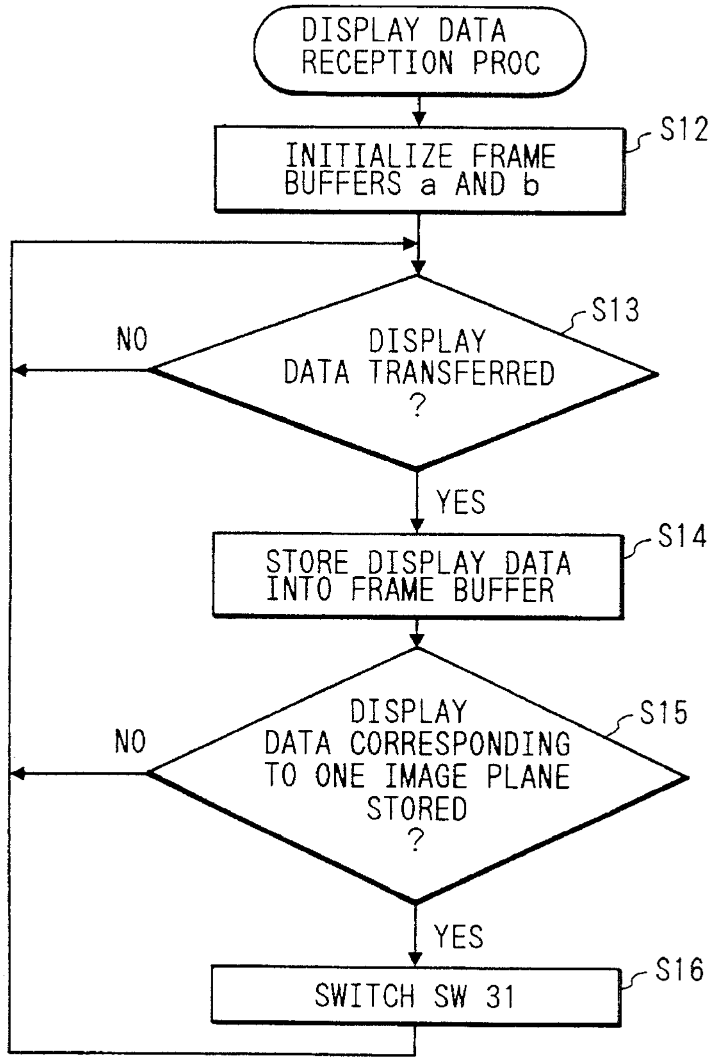

FIG. 11 is a flow chart showing the details of the display data reception process in step S06 in FIG. 10. In FIG. 11, the frame buffers (a) 29 and (b) 30 are initialized in step S12. In step S13, a check is made to see if the display data has been transferred or not. The process in step S13 is repeated until the display data is transferred. In step S14, the displayed data transferred in step S13 is stored into the frame buffer (a) 29 or (b) 30. In step S15, a check is made to see if the display data corresponding to one image plane has been stored or not. If NO, the processing routine is returned to step S13. If YES, step S16 follows and the switcher 31 is switched and the processing routine is returned to step S13. The processes in steps S13 to S16 are repeated.

Display Data Comparison Process

Figure 12:
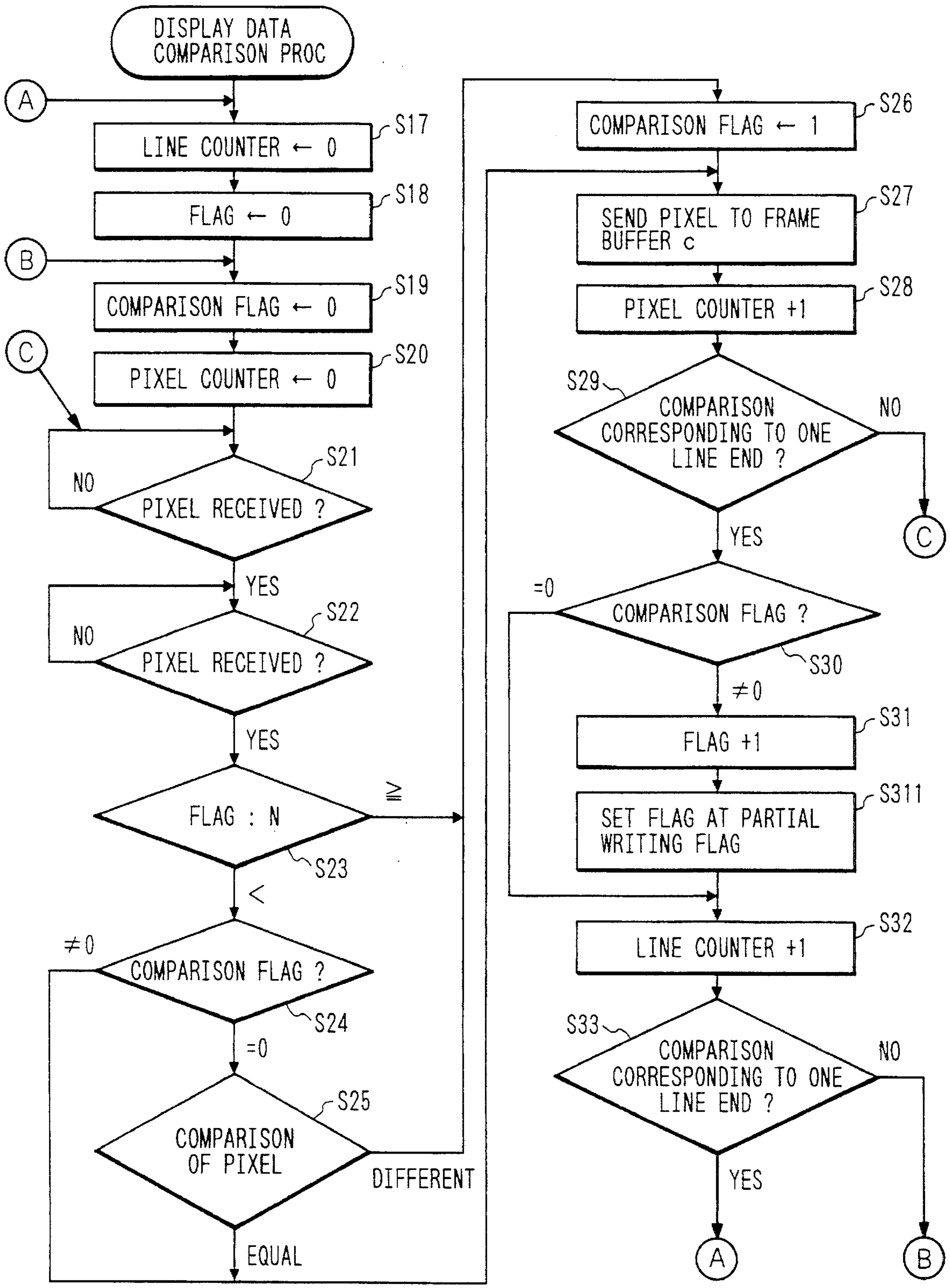

FIG. 12 is a flowchart showing the details of the display data comparison process in step S07 in FIG. 10. In FIG. 12, the count value of the line counter 324 is reset to "0" in step S17. The flag 321 is reset to "0" in step S18. The comparison flag 322 is reset to "0" in step S19. The count value of the pixel counter 323 is reset to the initial value "0" in step S20. A check is made in step S21 to see if the display data for display at present corresponding to one pixel has been received or not. The process in step S21 is repeated until the display data is received. In step S22, a check is made to see if the preceding display data corresponding to one pixel has been received or not. The process in step S22 is repeated until the display data is received. In step S23, the value of the flag 321 is compared with the constant N. When the value of the flag 321 is equal to or larger than N, this means that the image plane has been switched to quite a different image plane. Therefore, the data of one line is obviously different from the preceding data without needing to perform the comparison in step S24, so that the processing routine advances to step S26. When the value of the flag 321 is smaller than N, step S24 follows and the comparison flag 322 is checked. When the value of the comparison flag 322 is not equal to "0", this means that the at least one of the different pixels has already been detected in the line which is now being compared. Thus, step S26 follows. When the value of the comparison flag 322 is equal to "0", step S25 follows. In step S25, the data of the pixel received in step S21 (present display data) is compared with the data of the pixel received in step S22 (one preceding display data). When they are equal, step S27 follows. When they are different, the comparison flag is set to "1" in step S26. In step S27, the pixel which has been received in step S21 and is displayed at present is transferred to the frame buffer (c) 34. In step S28, the count value of the pixel counter 323 is increased by +1. In step S29, the count value of the pixel counter 323 is checked, thereby judging whether the comparing operations corresponding to one line have been finished or not. If NO, the processing routine is returned to step S21. By repeating the processes in steps S21 to S29, the data corresponding to one line is compared. If YES in step S29, step S30 follows. In step S30, a check is made to see if the value of the comparison flag 322 is equal to "0" or not. If YES, this means that the present display data is the same as the data of the preceding display line, so that step S32 follows. When the value of the comparison flag 322 is not equal to "0" in step S30, this means that the data of the present display line differs from the data of the preceding display data, so that the value of the flag is increased by +1 in step S31. In step S311, the flag corresponding to the line is set into the partial writing flag 35. In step S32, the count value of the line counter 324 is increased by +1. In step S33, the count value of the line counter 324 is checked, thereby discriminating whether the comparing operations of one image plane have been finished or not. If NO, the processing routine is returned to step S19. By repeating the processes in steps S19 to S33, the data corresponding to one image plane is compared. If YES in step S33, step S17 follows and the comparing processes corresponding to the next image plane are executed.

Pseudo Halftone Process

Figure 13:
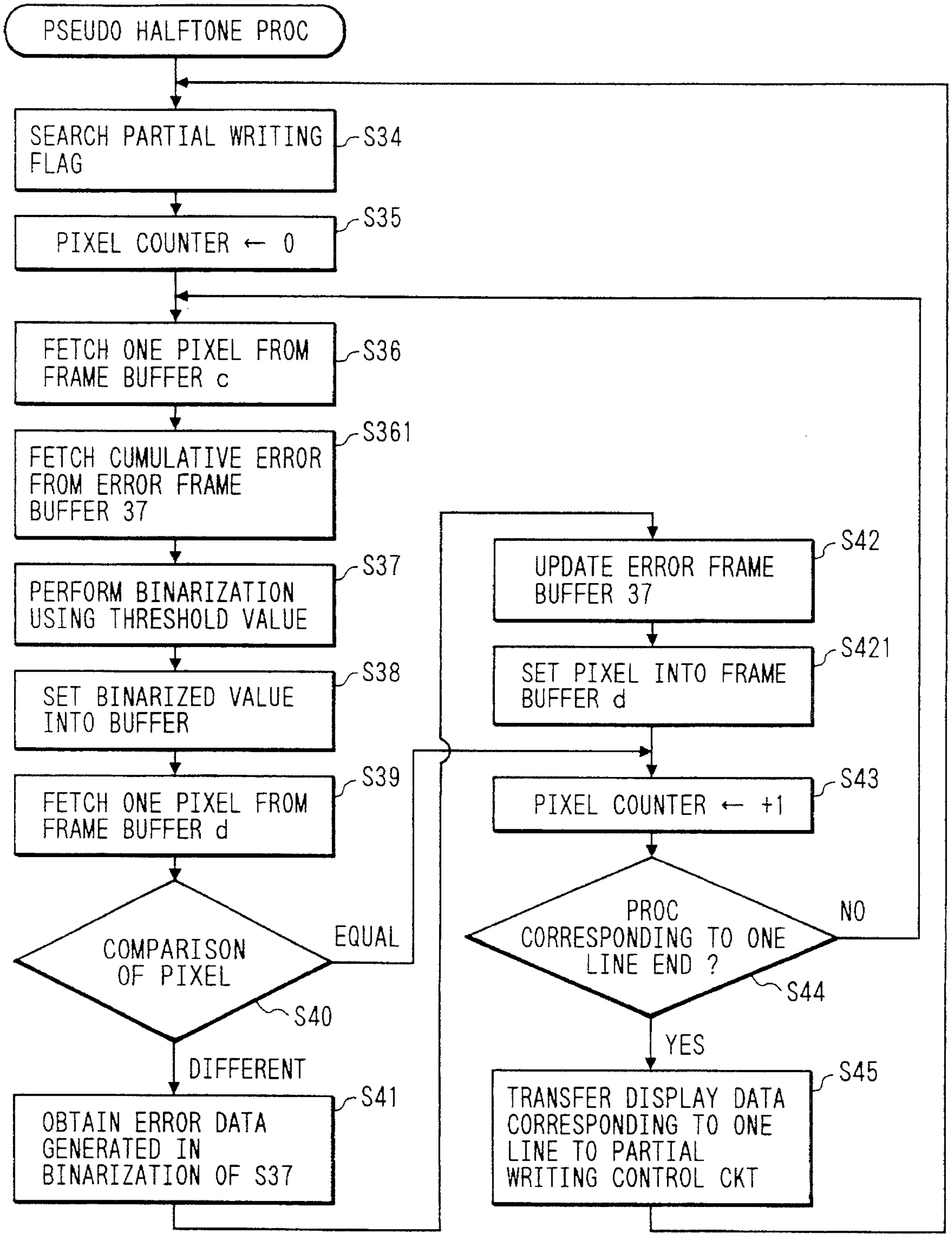

FIG. 13 is a flowchart showing the details of the pseudo halftone process in step S10 of the partial writing portion in FIG. 10. With respect to the pseudo halftone process corresponding to one image plane in step S10-1, all of the data of one image plane is binarized by the error diffusion method. Therefore, its detailed description are omitted here.

In FIG. 13, in step S34, the line to be partially written is extracted by retrieving the inside of the partial writing flag 35. In step S35, the count value of the pixel counter 362 is reset to "0". In step S36, the pixel corresponding to the count value of the pixel counter 362 of the line corresponding to the line detected in step S34 is extracted from the frame buffer (c) 34. In step S361, the cumulative error data corresponding to the value of the pixel counter 362 of the line corresponding to the line obtained in step. S34 is extracted from the error frame buffer 37. In step S37, the value which is derived by adding the value of the pixel fetched in step S36 and the cumulative error data fetched in step S361 is binarized on the basis of the threshold value. In step S38, the value binarized in step S37 is set to the location in the buffer 361 corresponding to the value of the pixel counter 362. In step S39, the pixel corresponding to the value of the pixel counter 362 of the line corresponding to the line obtained in step S34 is extracted from the frame buffer (d) 39. In step S40, the value of the pixel fetched in step S36 is compared with the value of the pixel fetched in step S39. When they are equal, since there is no need to update the error data stored in the error frame buffer 37, the processing routine advances to step S43. When they are different in step S40, step S41 follows. In step S41, differences between the input data and the binary data (0, 255) which occur upon binarization in step S37 are obtained. The error data that is diffused to a plurality of pixels is obtained by using the error spread table 364. In step S42, the value calculated in step S41 is rewritten in place of the cumulative error data stored at the corresponding location in the error frame buffer 37, thereby updating the error frame buffer 37. In step S421, the pixel fetched in step S36 is set into the frame buffer (d) 39 at the location corresponding to the value of the pixel counter 362 of the line corresponding to the line obtained in step S34.

In step S43, the count value of the pixel counter 362 is increased by +1. In step S44, the count value of the pixel counter 362 is checked, thereby judging whether the processes corresponding to one line have been finished or not. If NO, the processing routine is returned to step S36. By repeating the processes in steps S36 to S44, the halftone processes corresponding to one line are executed. When it is determined in step S44 that the processes for one line have been finished, in step S45, the display data in the buffer 361 is transferred to the partial write control circuit 38 and the processing routine is returned to step S34. The processes in step S34 to S45 are repeated after that.

Initializing Process

Figure 14:
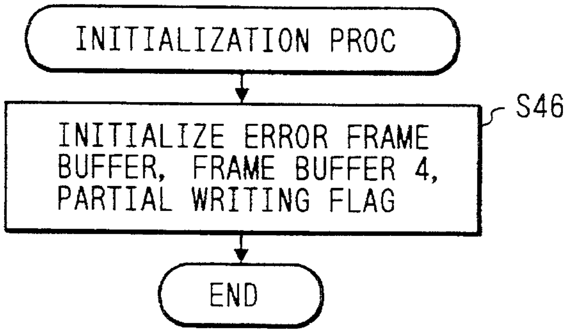

FIG. 14 is a flowchart for the initializing process in step S09 in FIG. 10. The initializing process is executed when the scene is switched in the comparison between the preceding image plane and the image plane to be newly displayed. In step S46, the error frame buffer 37, frame buffer (c) 39, and partial writing flag are initialized.

Although the embodiment has been described with respect to the case where the input data is expressed by one color, namely, the case of a monochromatic display, a color image can be also displayed by executing the above processes for each of the input data of three colors of R, G, and B.

Such a color display can be realized by providing the circuit shown in FIG. 2 for each of the input data of R, G, and B.

The display apparatus is not limited to the apparatus having the ferroelectric liquid crystal device as mentioned above but can also use a liquid crystal display apparatus of what is called a TFT type.

A method of executing the halftone process which can be used in the embodiment is not limited to the error diffusing method. It is also possible to use any other method such as average error least method, average density preserving method, or the like which can correct the errors occurring when input data is quantized.

Although the embodiment has been described with respect to the example in which the input data is converted into the binary data, in the case where the FLCD can display gradations of a multilevel which is larger than 2 for one pixel, it is sufficient that the input data is quantized into the multilevel data which can be displayed by the FLCD and that the error data in the error frame buffer 37 is updated on the basis of the error data occurring upon quantization.

According to the present invention as described above, in the case where an animation is halftone processed by the quantizing method of the density preserving type and is displayed, the halftone process is executed to only the changed portion which was changed from the preceding image plane, so that the display data can be displayed at a high speed by the efficient processes.

Moreover, since the error data necessary to the halftone process of the changed portion has previously been stored in the memory, the display image of a high image quality can be obtained by using the error data stored in the memory.

Further, in the case where the scene of the display data is changed, the error data of the preceding image plane stored in the memory is reset and the halftone process is executed for the input data of one image plane, so that the binarizing process according to the input data can be executed at a high fidelity.

Although the present invention has been described with respect to the preferred embodiment the invention is not limited to the foregoing embodiment but many modifications and variations are possible within the spirit and scope of the appended claims of the invention.

What is claimed is:

1. A display control apparatus comprising:

input means for inputting image data of first and second image planes;

processing means for executing a halftone process to the inputted image data;

memory means for storing error data occurring due to the execution of the halftone process by said processing means; and transmitting means for transmitting the image data which has been halftone processed by said processing means to a display apparatus, wherein said memory, means stores the error data occurring when the image data of the first image plane is halftone processed, and when the image data of the second image plane is processed, said processing means executes the halftone process on the basis of the error data stored in the memory means.

2. An apparatus according to claim 1, further comprising a display apparatus having a ferroelectric liquid crystal device.

3. An apparatus according to claim 1, wherein said input means inputs image data sent from a computer.

4. An apparatus according to claim 1, wherein said processing means binarizes the image data into the binary data.

5. An apparatus according to claim 1, further having comparing means for comparing the image data of the first image plane and the image data of the second image plane, and wherein said processing means executes the halftone process to the image data of a pixel of the second image plane such that a value of the image data of the first image plane is different from a value of the image data of the second image plane.

6. An apparatus according to claim 5, further having means for updating the error data stored in said memory means on the basis of the error data occurring when the image data of the second image plane is halftone processed.

7. A display control apparatus comprising:

input means for inputting image data of first and second image planes;

processing means for executing a halftone process to the inputted image data;

memory means for storing error data occurring due to the halftone process;

transmitting means for transmitting the image data which has been halftone processed by said processing means to a display apparatus;

judging means for comparing the image data of the first image plane and the image data of the second image plane, thereby judging whether a scene has been switched or not; and control means for resetting the error data stored in said memory means when said judging means discriminates that the scene has been switched.

8. An apparatus according to claim 7, wherein said memory means stores the error data occurring when the image data of the first image plane is halftone processed.

9. An apparatus according to claim 8, wherein when the scene is not switched, said processing means executes the halftone process to the image data of the second image plane on the basis of the error data stored in said memory means and the image data of the second image plane.

10. A display control apparatus comprising:

input means for inputting image data of a first image plane and image data of a second image plane;

process means for executing a halftone process to the input image data;

transmission means for transmitting the data which has been halftone-processed by said process means to a display apparatus;

judgment means for comparing the image data of the first image plane and the image data of the second image plane to discriminate whether or not a scene has been switched; and control means for controlling said process means, wherein said control means controls said process means such that when said judgment means discriminates that the scene has been switched, said process means executes the halftone process to the input image data of one image plane of the second image plane, and when said judgment means discriminates that the scene has not been switched, said process means executes the halftone process to the image data of one image plane of the second image plane, with the image data corresponding to a portion of the second image plane which has been changed from a corresponding portion of the first image plane.

11. An apparatus according to claim 10, further comprising:

memory means for storing error data occurred in the halftone process, and reset means for resetting the error data stored in said memory means in the case where said judgment means discriminates that the scene has been switched.

12. An apparatus according to claim 11, wherein said memory means stores the error data occurred in case of halftone-processing the image data of the first image plane.

13. An apparatus according to claim 12, wherein when the scene has not been switched, said process means executes the halftone process to the image data of one image plane of the second image plane on the basis of the error data stored in said memory means and the image data of the second image plane.

14. A display control method comprising the steps of:

inputting image data of first and second image planes;

executing a halftone process to the inputted image data;

storing error data occurring due to the execution of the halftone process; and transmitting the image data which has been halftone processed to a display apparatus, wherein the error data occurring when the image data of the first image plane is halftone processed is stored, and when the image data of the second image plane is processed the halftone process is executed on the basis of the stored error data.

15. A display control method comprising the steps of:

inputting image data of first and second image planes;

executing a halftone process for the inputted image data;

storing error data occurring due to the halftone process;

transmitting the image data which has been halftone processed to a display apparatus;

comparing the image data of the first image plane and the image data of the second image plane to determine whether a scene has been switched or not; and resetting the stored error data when it is determined that the scene has been switched.

16. A display control method comprising the steps of:

inputting image data of a first image plane and image data of a second image plane;

executing a halftone process to the input image data;

transmitting the data which has been halftone processed to a display apparatus;

comparing the image data of the first image plane and the image data of the second image plane to discriminate whether or not a scene has been switched; and controlling the execution of the halftone process to the input image data such that when it is discriminated that the scene has been switched, the halftone process to the input image data of one image plane of the second image plane is executed, and when it is discriminated that the scene has not been switched, the halftone process to the image data of one image plane of the second image plane is executed, with the image data corresponding to a portion of the second image plane which has been changed by a corresponding portion of the first image plane.

* * * * *

UNITED STATES PATENT AND TRADEMARK OFFICE

CERTIFICATE OF CORRECTION

PATENT NO. : 5,483,634

DATED : January 9, 1996

INVENTOR(S) : Hasegawa

It is certified that error appears in the above-indentified patent and that said Letters Patent is hereby corrected as shown below:

On drawing,

SHEET 7:

FIG. 10, "PECEPTION" should read --RECEPTION--.

COLUMN 5:

Line 45, "↑" should read --1--.

COLUMN 9:

Line 18, "step 311," should read --step 31,--.

COLUMN 11:

Line 24, "memory," should read --memory--.

Signed and Sealed this

Ninth Day of July, 1996

Attest:

Bruce Lehman

BRUCE LEHMAN

Attesting Officer

*Commissioner of Patents and Trademarks*